(12) United States Patent
Rao et al.

(10) Patent No.: US 9,626,564 B2
(45) Date of Patent: Apr. 18, 2017

(54) SYSTEM FOR ENABLING EYE CONTACT IN ELECTRONIC IMAGES

(71) Applicant: Intel Corporation, Santa Clara, CA (US)

(72) Inventors: Raghavendra R. Rao, Bangalore (IN); Anbumani Subramanian, Bangalore (IN)

(73) Assignee: INTEL Corporation, Santa Clara, CA (US)

(*) Notice: Subject to any disclaimer, the term of this patent is extended or adjusted under 35 U.S.C. 154(b) by 0 days.

(21) Appl. No.: 14/543,012

(22) Filed: Nov. 17, 2014

(65) Prior Publication Data

US 2016/0142673 A1  May 19, 2016

(51) Int. Cl.
H04N 5/228 (2006.01)
G06K 9/00 (2006.01)
H04N 7/14 (2006.01)

(52) U.S. Cl.
CPC ........... *G06K 9/0061* (2013.01); *H04N 7/144* (2013.01); *H04N 2007/145* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,643,703 B1* | 2/2014 | Karakotsios | ............... | G06F 3/14 345/156 |
| 2007/0171369 A1* | 7/2007 | Grundig | ............... | A61B 3/0025 351/210 |
| 2011/0188738 A1* | 8/2011 | Roussel | ................... | G06T 17/20 382/154 |
| 2013/0194177 A1* | 8/2013 | Sakata | ............... | H04N 21/4223 345/156 |
| 2013/0215222 A1* | 8/2013 | Tsukagoshi | ........ | H04N 13/0022 348/43 |
| 2014/0064579 A1* | 3/2014 | Lee | ........................ | G06T 7/0075 382/128 |
| 2014/0160123 A1* | 6/2014 | Yang | ....................... | G06T 17/00 345/420 |

(Continued)

OTHER PUBLICATIONS

Tan et al., "Enabling Genuine Eye Contact and Accurate Gaze in Remote Collaboration", HP Laboratories, HPL-201096, IEEE International Conference on Multimedia and Expo 2010, Jul. 19, 2017, 7 pages.

(Continued)

*Primary Examiner* — Duc Nguyen
*Assistant Examiner* — Assad Mohammed
(74) *Attorney, Agent, or Firm* — Finch & Maloney PLLC

(57) ABSTRACT

Techniques are disclosed for improving perceived eye-contact in video communications on personal communication devices that have a camera positioned offset slightly away from a display screen, such as found in tablets, mobile phones, laptops, desktops ultrabooks, all-in-ones, and the like. A three-dimensional mesh, such as a point cloud, may be created from an image and depth information that is captured of the user. A viewing direction of is determined by assessing the three-dimensional mesh and the mesh is rotated to minimize the angle between the viewing direction and a line of sight between the user's eyes and the camera.

23 Claims, 8 Drawing Sheets

(56) References Cited

U.S. PATENT DOCUMENTS

| | | | | |
|---|---|---|---|---|
| 2014/0267021 A1* | 9/2014 | Lee | ................. | G06F 3/0304 |
| | | | | 345/156 |
| 2014/0313308 A1* | 10/2014 | Wang | ................. | G06K 9/00604 |
| | | | | 348/78 |
| 2015/0030214 A1* | 1/2015 | Fujiwara | ........... | G06F 17/30247 |
| | | | | 382/118 |
| 2015/0042743 A1* | 2/2015 | Cullen | ............... | G06K 9/00302 |
| | | | | 348/14.02 |

OTHER PUBLICATIONS kuster, et al., "Gaze Correction for Home Video Conferencing", Proceedings of ACM SIGGRAPH Asia, Singapore, Nov. 28-Dec. 1, 2012, ACM Transactions on Graphics, vol. 31, No. 6, pp. 174:1-174:6, 6 pages.

Rusu, Radu Bogdan, "Semantic 3D Object Maps for Everyday Manipulation in Human Living Environments" Dissertation, Technische Universität München, The Dissertation was on Jul. 14, 2009 at the Technische Universität München, submitted and approved by the faculty for computer science on Sep. 18, 2009, 284 pages.

Zhang, "Image-Based Modeling of Objects and Human Faces", Microsoft Research, SPIE Conference Videometrics and Optical Methods for 3D Shape Measurement, Proceedings of SPIE vol. 4309, Jan. 21-26, 2001, 15 pages.

Gemmell et al., "Gaze Awareness for Video-Conferencing: A Software Approach", IEEE, Computer Supported Cooperative Work, Oct.-Dec. 2000, 1070-986X, 10 pages.

\* cited by examiner

SYSTEM FOR ENABLING EYE CONTACT IN ELECTRONIC IMAGES

BACKGROUND

User participation in video conferencing and video chatting with personal electronic devices, such as smartphones, tablet, laptop and desktop computers has become more prevalent due to the greater inclusion of cameras being included in such devices. Cameras, however, are often positioned in such devices offset with respect to a display that the user views while participating in a video conference or video chat. This often results in an image of the user appearing as if the user is looking away from the camera without making eye contact, which limits user experience.

DETAILED DESCRIPTION

Figure 1A:
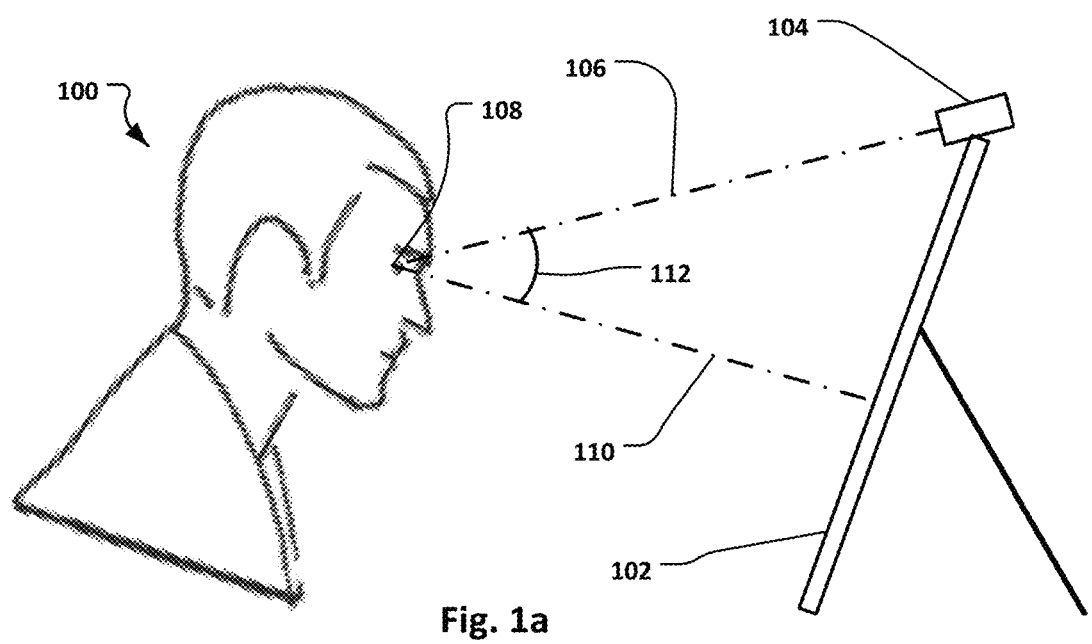
FIGS. 1a and 1b show a representation of a user viewing a display of a computer having a camera that is offset from the display and a representation of the user that is rotated to cause perceived eye contact, respectively, according to an embodiment of the present disclosure.

Techniques disclosed herein enable perceived eye contact in video communications on personal communication devices, although the techniques also apply to any platform where a camera is placed slightly away from a display screen—as in tablets, mobile phones, laptops, ultrabooks, and all-in-ones. In video conferencing and video chat applications, a user often appears to be looking elsewhere in a video image shown on a display screen, as the video image of the user is captured while the user is looking into his/her display rather than a camera that is offset from the display, as illustrated in FIG. 1a. The techniques described herein address the lack of eye contact, in one example embodiment, by calculating surface normals in an eye area of the user's face, with information captured by a calibrated stereo camera or a depth camera, and automatically rotating the user's face in three-dimensions before transmission. The synthesized, rotated view with respect to the camera system effectively creates an image in which the user appears to be looking directly at the camera system and hence establishes apparent eye contact. In this sense, the techniques provide automatic gaze correction.

According to some example embodiments, gaze correction/eye contact is accomplished by identifying a face and eye area of a user in a captured image that includes three-dimensional information, such as depth information. A three-dimensional mesh of the user is created with the depth information. The surface normals of the user's face can be generated using the three dimensional mesh. The three-dimensional face can then be rotated (e.g., about a horizontal axis) to achieve gaze correction. In more detail, a viewing direction of the user can be determined by calculating surface normals in the eye area, and then determining a mean surface normal that emanates from the eye area, according to one example embodiment. The three-dimensional mesh (three-dimensional face, or point cloud) may then be rotated to minimize any angle between the viewing direction and a line of sight between the user's eyes and the camera. The image (or view) of the user that was captured with the camera may be updated with an image (or view) projected from the rotated mesh and that has apparent eye contact. The updated portion of the image may, according to some example embodiments, also include the torso area of the user, in addition to the user's head.

As noted above, FIG. 1a shows a user 100 viewing a computer screen 102 to participate in a video conference other similar type activity. As may be seen, the user 100 is viewing the computer screen while a camera 104 captures an image of the user for display to other participants of the video conference. The user, however, is not looking at the camera in the image that is captured by the camera, due to the offset that exists between the camera and the display. The line of sight 106 shown in FIG. 1a is a direct line between the lens of the camera 104 and the eyes 108 of the user and the view direction 110 of the user lies along a line on which the user may be perceived to looking, based on the positioning of the user's head and face. Viewing angle 112 is identified in FIG. 1A as the angle between the line of sight of the camera and the view direction. As may be appreciated, viewing angles with values closer to zero indicate that the user appears to be looking more directly at a camera while viewing angles of larger values suggest that a user appears to be looking away from the camera.

Figure 1B:
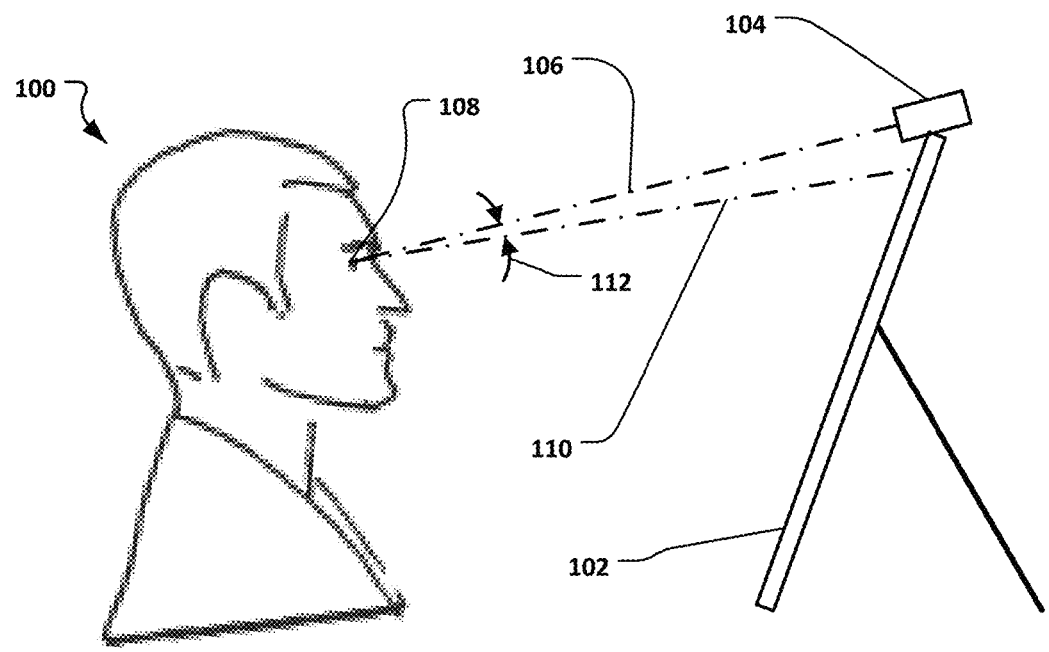

FIG. 1b shows the computer display and user of FIG. 1a, with the representation of the user 100 rotated to minimize the viewing angle 112 with respect to the line of sight 106 of the camera 104. In this respect, eye contact appears to be established as the user appears to be looking at the camera 104 in FIG. 1b and thus at any other individuals who might be viewing the image of the user captured by the camera, such as other participants in a video conference. It is to be appreciated that the view direction, in this example embodiment, is derived from the positioning of the user's face and features thereof, rather than any direction that may be indicated by positioning of pupils of a user.

Figure 2:
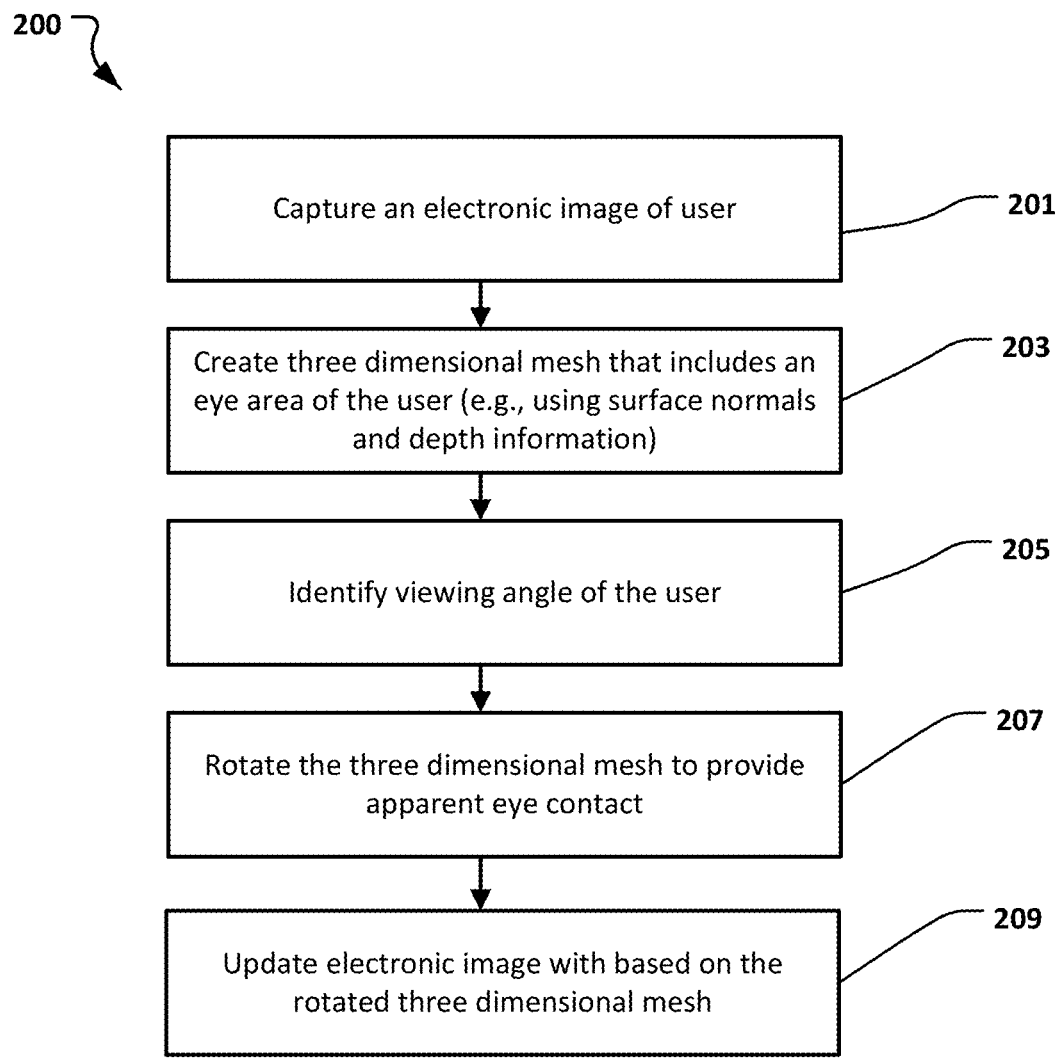
FIG. 2 depicts acts of a method of enabling perceived eye contact of a user in an electronic image that includes updating the electronic image based on a rotated three dimensional mesh, according to an embodiment of the present disclosure.

Techniques that establish eye contact or apparent eye contact of a user in an electronic image include the acts represented in the flow diagram of FIG. 2, according to various example embodiments. Initially, an electronic image is captured with one or more cameras 201. A three-dimensional mesh is created from the electronic image 203 and that includes at least an eye area of the user. Various techniques are used to identify a viewing angle of the user 205 from the three-dimensional mesh, such as by defining surface normals about the eyes of the user in the mesh, as discussed in greater detail herein. The three-dimensional mesh is rotated 207 to minimize the viewing angle with respect to a line of sight of the camera in the captured the image. The electronic image is updated, based on the rotated three-dimensional mesh 209, such as by projecting a two dimensional view of the user onto the image from the rotated three-dimensional mesh. In rotating the three-dimensional mesh and updating the electronic image, eye contact or at least apparent eye contact is established or otherwise improved for the user (i.e., the subject in the image) as may be perceived by anyone viewing the user in the updated electronic image.

Figure 3A:
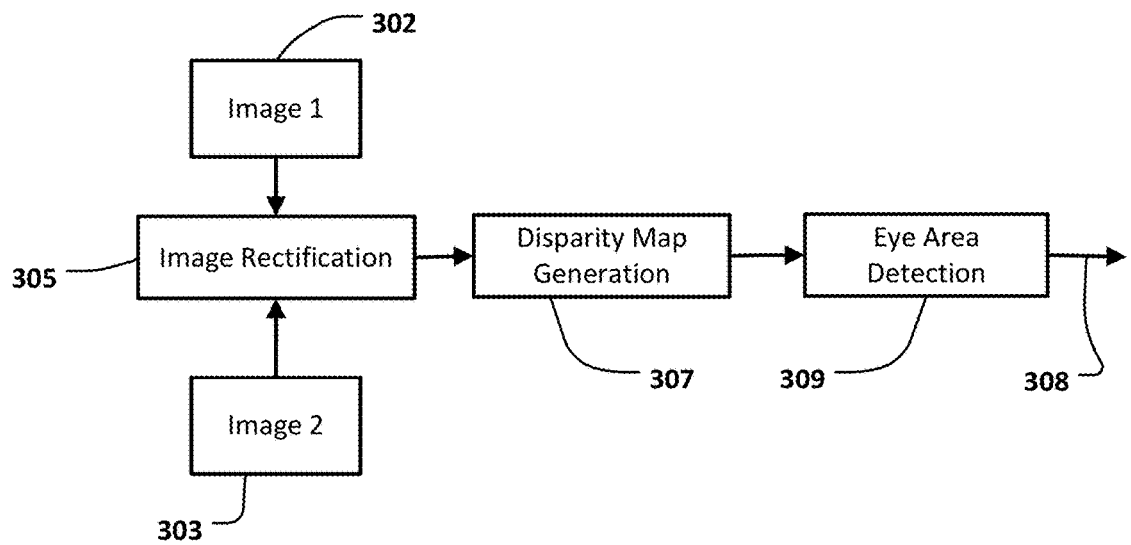
FIGS. 3a and 3b depict acts associated with image capture using a stereo camera and a depth camera, respectively, according to example embodiments of the present disclosure.

Image capture may be accomplished with different types of cameras that produce images from which a three-dimensional mesh may be developed. According to the embodiment of FIG. 3a, a stereo camera may be used to capture user images 302, 303 from different angles at a common time. Such cameras, once calibrated, may produce a stereoscopic pair of images 302, 303 from which an image may be produced, either as a three-dimensional image or a two dimensional image that includes auxiliary depth information. It is to be appreciated that the terms "stereo camera" and "calibrated camera", as used herein, refer to two or more cameras that are configured to capture an image of a common subject from different angles, where the different angles are known or are "calibrated". Information captured by the stereo camera may be rectified 305 to produce a two dimensional image. A disparity map may also be generated 307 from the rectified stereoscopic pair of images to identify depth information, ahead of subsequent steps 308, including eye area detection 309, as described in greater detail herein.

A three-dimensional mesh may be constructed from a stereoscopic pair of images by rectifying the pair of images and then generating a disparity map, as noted above. Through rectification, two (or more) images of a user are projected onto a common plane to produce a two dimensional image. A disparity map may also be produced from the two (or more) images of the user that includes depth information associated with points or groups of points in the two-dimensional image that is produced through rectification. As a result a two dimensional image made up of a grid of pixels each associated with color or grayscale information is produced along with depth information that is associated with each pixel or subsets/groupings of pixels.

Figure 3B:
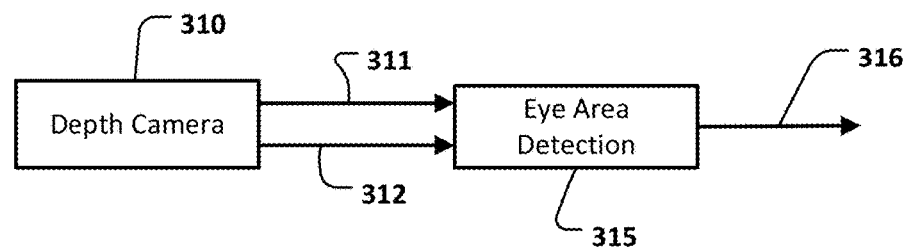

According to other example embodiments as shown in FIG. 3b, a depth camera 310 may be used to capture an image of a user. Depth information 311 and image information 312, such as color (e.g., Red, Green, and Blue values) or grayscale values that are recorded by the depth camera may then be assessed to detect an eye area 315 of a user ahead of any further processing 316. It is to be appreciated that other types of cameras that produce images including depth information may also be used, according to various embodiments, as the embodiment are not limited to those types of cameras explicitly disclosed herein. One example of a commercialized camera that provides depth information and that may be used according to various example embodiments is the Intel® RealSense™ camera.

Depth information may be used to create a mesh that includes a point cloud, according to one example embodiment. In such a mesh, points are defined in a coordinate system to represent a point on a surface of user's face or body. As may be appreciated, depth information as captured from a depth camera or disparity map may already be in format where depths (i.e., positions) are identified for the surface of a face as associated with each pixel in a two dimensional image. In this respect, the depth information may be readily convertible to a point cloud. Although example embodiments are described herein that utilize point clouds as three-dimensional meshes, it is to be appreciated that other types of three-dimensional meshes may also be used, such as surface maps and the like.

Figure 4A:
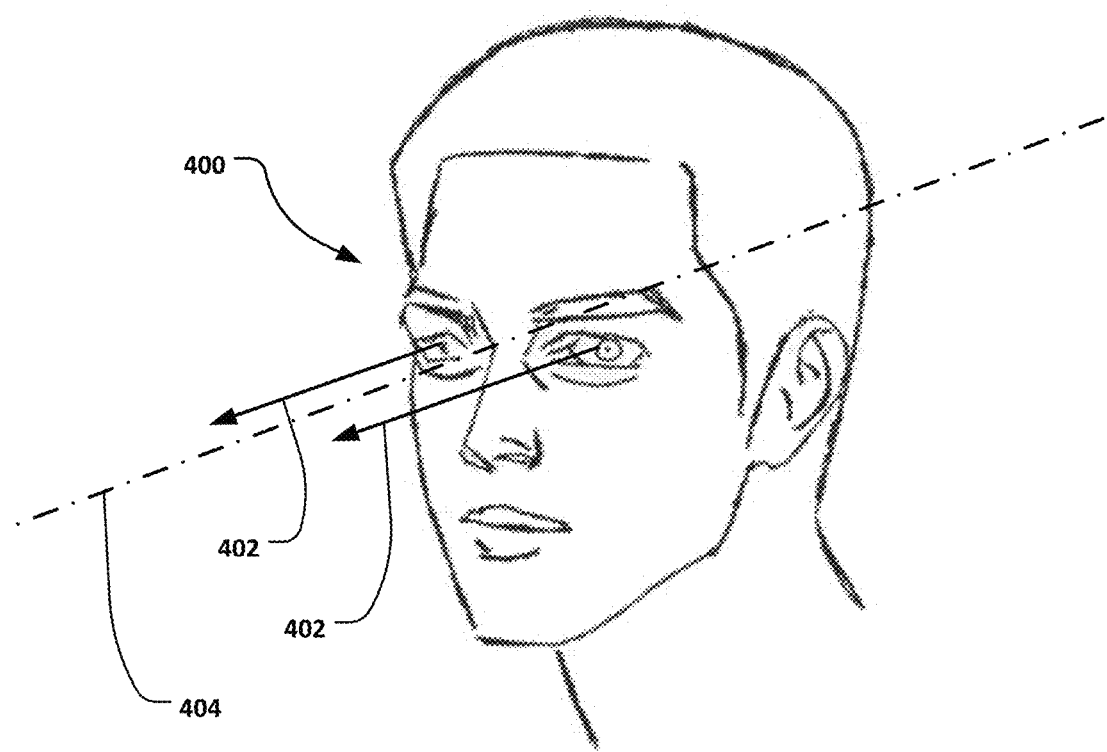
FIGS. 4a and 4b show calculated mean surface normals that represent a viewing direction of user in an electronic image and an example of surface normals emanating from a surface, respectively, according to an embodiment of the present disclosure.
Figure 4B:
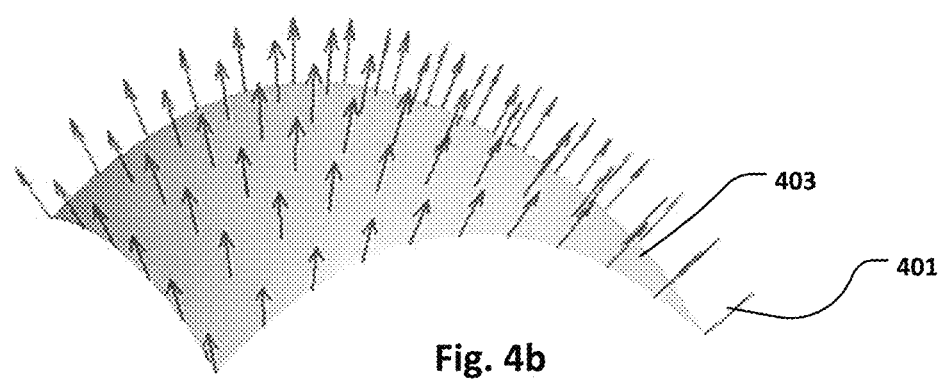

Viewing angle may be determined assessing features of a user's face 400 in a three-dimensional mesh. According to some example embodiments, viewing angle is determined by identifying a vector 401 that emanates from one or both of the eyes of a user in a direction associated with the view that would be taken by the user with pupils centered within the eyes of the user, as shown in FIG. 4a. That is, view direction and view angle may be determined from features of a user's face, other than positioning of the user's pupils. In some example embodiments, surface normals of the user's face (i.e., vectors orthogonal to a plane that is tangent to a surface of the user's face at any given point) are calculated from the three-dimensional mesh. An example of surface normals 401 emanating from a surface 403 is shown in FIG. 4b. A mean surface normal 402, calculated as an overall mean of surface normals that extend from eyes balls and/or eyelids of the user and/or an eye area, may be used to represent the viewing direction 404. Other approaches may, additionally or alternately, be used to calculate viewing direction. By way of an example, features of a user's face, such as eye sockets, nose, forehead, mouth, and the like may be used to identify positioning of a user's eyes and/or viewing direction. Example methods for calculating surface normals, such as from surface meshes that include point clouds, may be found at www.pointcloud.org.

Techniques may be used to minimize or reduce computational costs associated with identifying a viewing direction. According to some example embodiments, an area associated with eyes of a user is identified prior to surface normals being calculated. In this respect, computational costs associated with calculating surface normals for other portions of a face are avoided. An eye area of a face may be identified by first identifying various features of a user's face, including nose, mouth, forehead, cheekbones, an outline of a user's head, and/or the eyes of a user themselves, according to various embodiments. Various computational costly acts, such as surface normal calculation, may then be performed only on the area or other identified portions of the user's face.

Viewing angle may be determined as the angle or angles between the viewing direction and the line of sight of the camera about one or more different axes. The applicant has appreciated that minimizing tilt angle of a user's head with respect to the line of sight of the camera may provide the greatest impact in producing apparent eye contact. Accordingly, some example embodiments may minimize viewing angle primarily or solely in a tilt direction. Tilt angle, as used herein refers to the degree to which a user is looking up or down in a vertical direction with respect to the line of sight of the camera (i.e., rotation about a horizontal axis). Viewing angles may, additionally or alternatively, be minimized in other ways, such as by minimizing a pan angle and/or a rotation angle. Pan angle, as used herein, refers to the degree to which a user is looking to the side with respect to the line of sight of a camera (i.e., rotation about a vertical axis). Rotation angle refers to the degree to which a user's head may be cocked or angled with respect to a vertical axis (i.e., rotation about an axis that lies parallel to the line of sight of the camera).

The three-dimensional mesh may be rotated, once a viewing angle has been determined, in various manners to minimize the viewing angle. A pivot point to be used in rotating the three-dimensional mesh is determined by the intersection of the line of sight and the viewing direction, according to one example embodiment. A coordinate transform may then be performed to rotate the three-dimensional mesh about the identified pivot in the desired direction and a desired amount. Color and/or grayscale information associated with each point of the three-dimensional mesh is carried with each point of the mesh through rotation, thus enabling the captured two dimensional image to be updated with a rotated image taken from the rotated three-dimensional mesh.

All or a portion of an image that represent a user in a captured image may be rotated to provide apparent eye contact, such as is represented in FIGS. 1a and 1b. According to some example embodiments, the head and torso of a user are identified in an image, as captured. The three-dimensional mesh is then created from the captured images and the identified head and torso may be rotated together to provide the appearance of eye contact. It is to be appreciated, however, that in other embodiments, less than all of the user's face, head, and/or torso are rotated to the appearance of eye contact. Different portions of the captured image may, according to some embodiments, be rotated different amounts. By way of example, the face and head of multiple people in the captured image may be rotated to different degrees to accomplish various effects.

Color and/or grayscale values associated with rotated positions of the mesh are projected onto the captured image, at the rotated positions of the mesh, to update the captured image with an image of the user that includes the appearance of eye contact. The projected values may replace those in of the image as captured. As may be appreciated, the area associated with the image that is projected from the rotated three-dimensional mesh may be of a different shape and/or size than the portion of the two dimensional image from which the image was created. Various image fitting, stitching and smoothing techniques may be applied to the two dimensional image to address the appearance at boundaries between the projected two-dimensional image and the image as captured.

Initial assessments may be made to determine whether image rotation to provide apparent eye contact is to be implemented or deactivated. According to some embodiments, image rotation is not performed when a user is looking to the side, rather than at a display that is offset from the camera (i.e., when the pan angle for a particular user is too great). Such conditions may be determined from a three-dimensional mesh through the techniques described herein or directly from a captured image. Positioning of features of a user's face may be identified directly in an image as captured to determine whether to perform image rotation. In one example embodiment, image rotation is deactivated unless both of a user's eyes are identifiable in a captured image.

Images may be captured that include multiple individuals. In such scenarios, three-dimensional meshes may be created individually for each of the individual users in the captured image. View directions and view angles may additionally be determined for the multiple users on an individual basis. Each of the individual meshes may be rotated according to the individually determined view angles. Two-dimensional images may then be projected onto the captured image for each of the users. In this respect, the resulting image may include apparent eye contact for two or more individuals in a common electronic image.

Figure 5A:
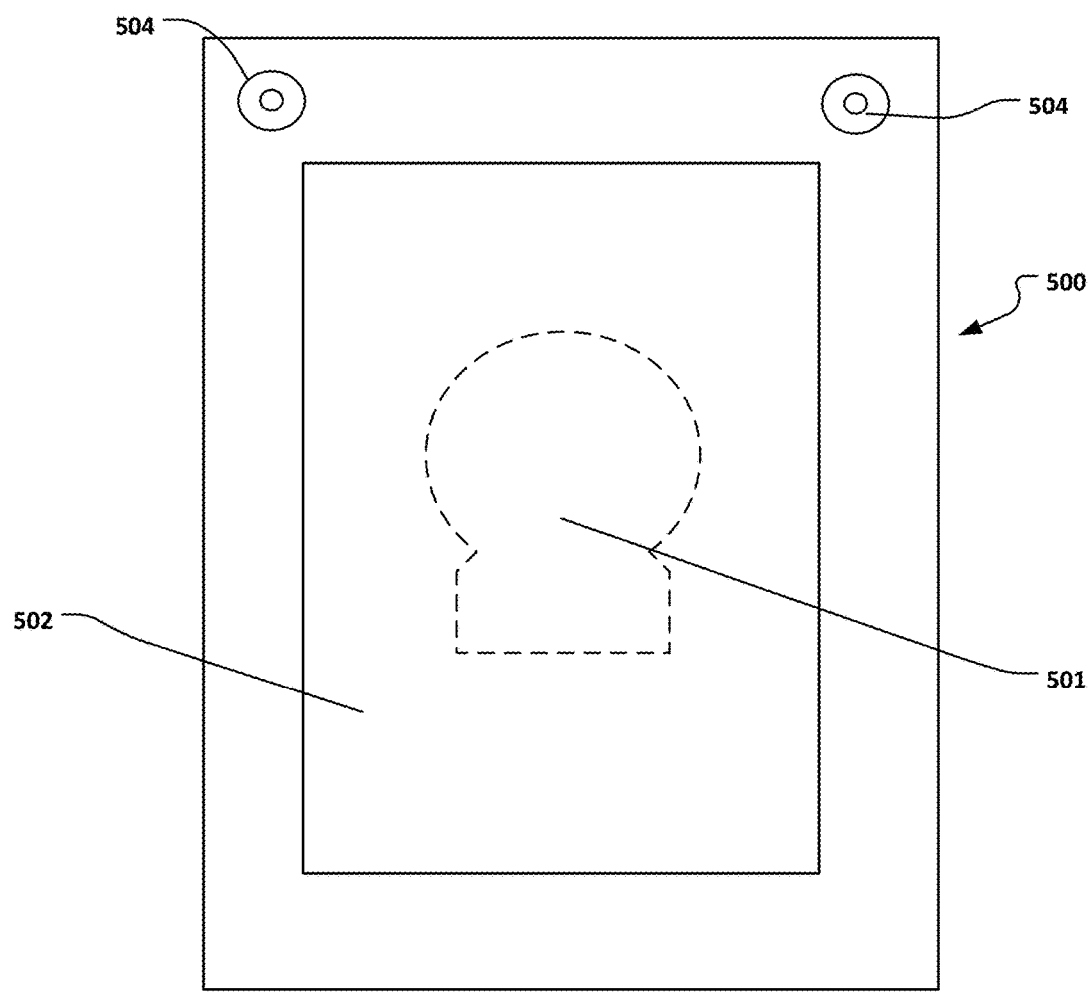
FIGS. 5a and 5b show a tablet type computing device that includes a stereo camera and a depth sensor, respectively, according to example embodiments of the present disclosure.
Figure 5B:
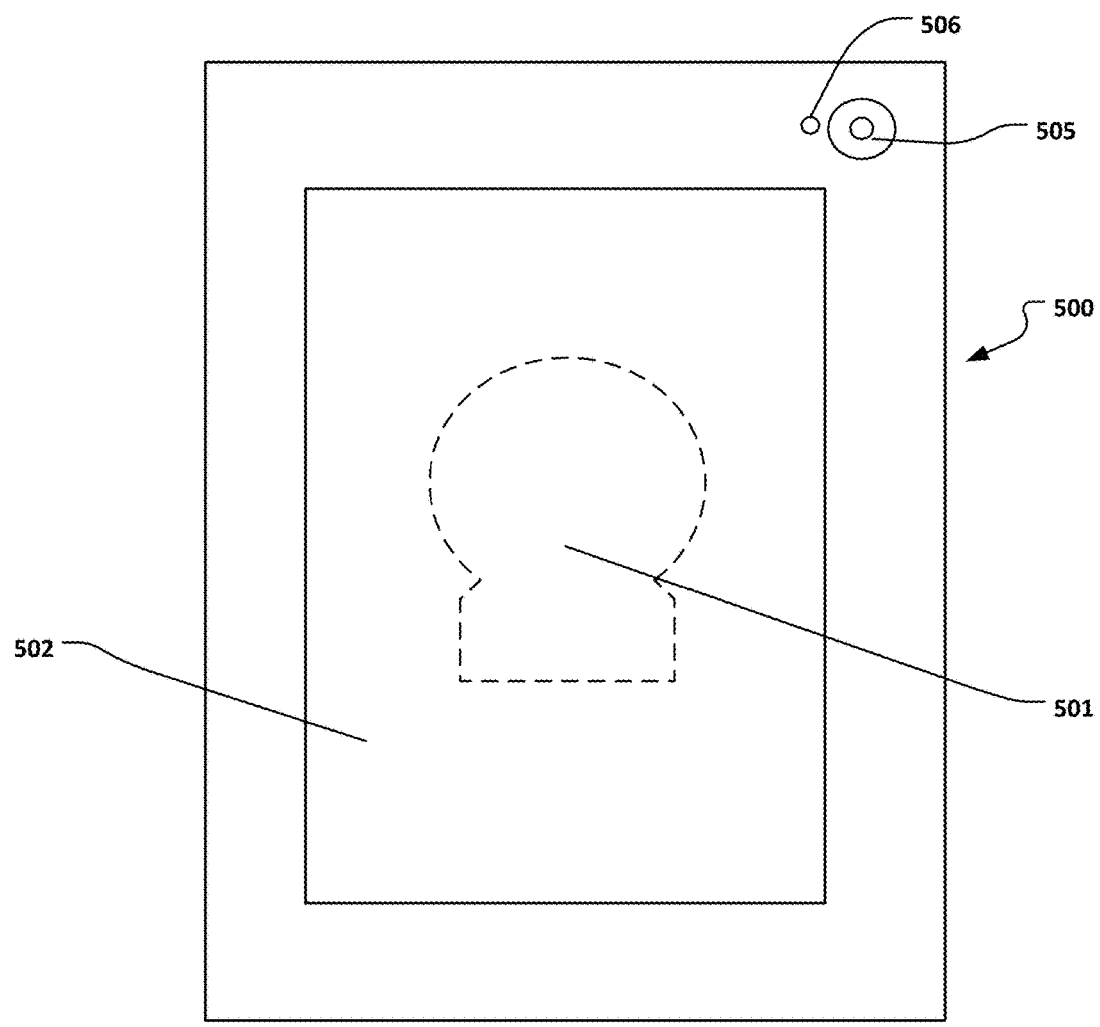

It is to be appreciated that the techniques described herein are applicable to numerous types of computing devices that include cameras or other type of image capture devices. By way of non-limiting example, FIG. 5a shows the display screen 502 of what may be a tablet or smartphone type-computing device 500. The tablet includes a calibrated pair of stereo cameras 504 at the top of the display that may be used to capture an image 501 of a user viewing the display, as described herein. FIG. 5b another embodiment of what may be a table or smartphone type-computing device 500 that includes a single camera 505 and a depth sensor 506 that may be used to gather depth information associated with a user, either in addition to the calibrated stereo camera with a single camera in place of the stereo camera.

EXAMPLE SYSTEM

Figure 6:
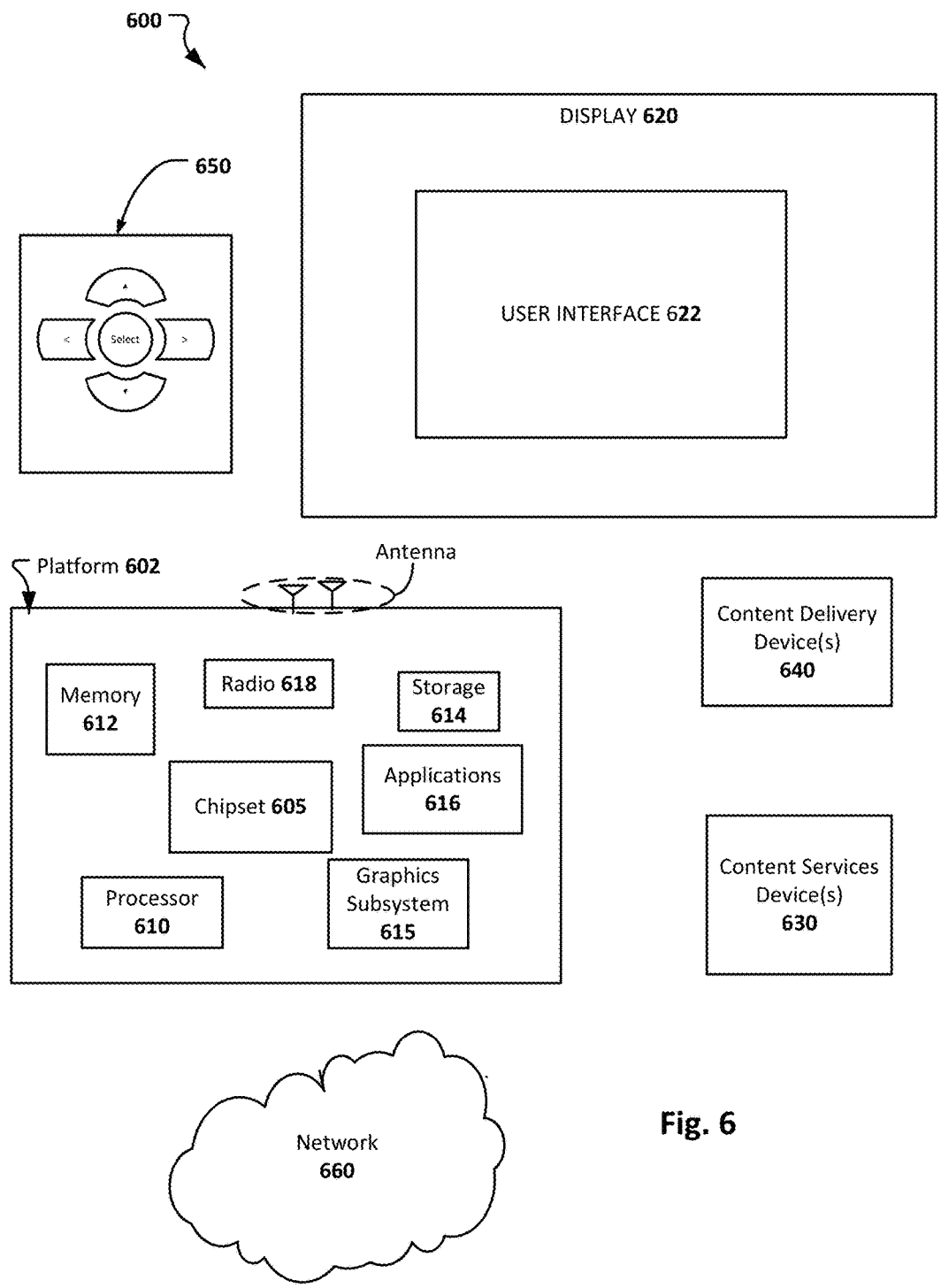
FIG. 6 shows a media system configured in accordance with an embodiment of the present disclosure.

FIG. 6 illustrates a system 600 configured in accordance with an embodiment of the present disclosure. In some embodiments, system 600 may be a system for showing face still or moving user images although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620, so as to supplement navigational gesturing by the user. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video images for display, and in some embodiments is configured to synthesize user face and/or torso images, as variously described herein. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques, including the techniques for providing perceived eye contact or apparent eye contact described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off" In addition, chipset 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., face images, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 6.

Figure 7:
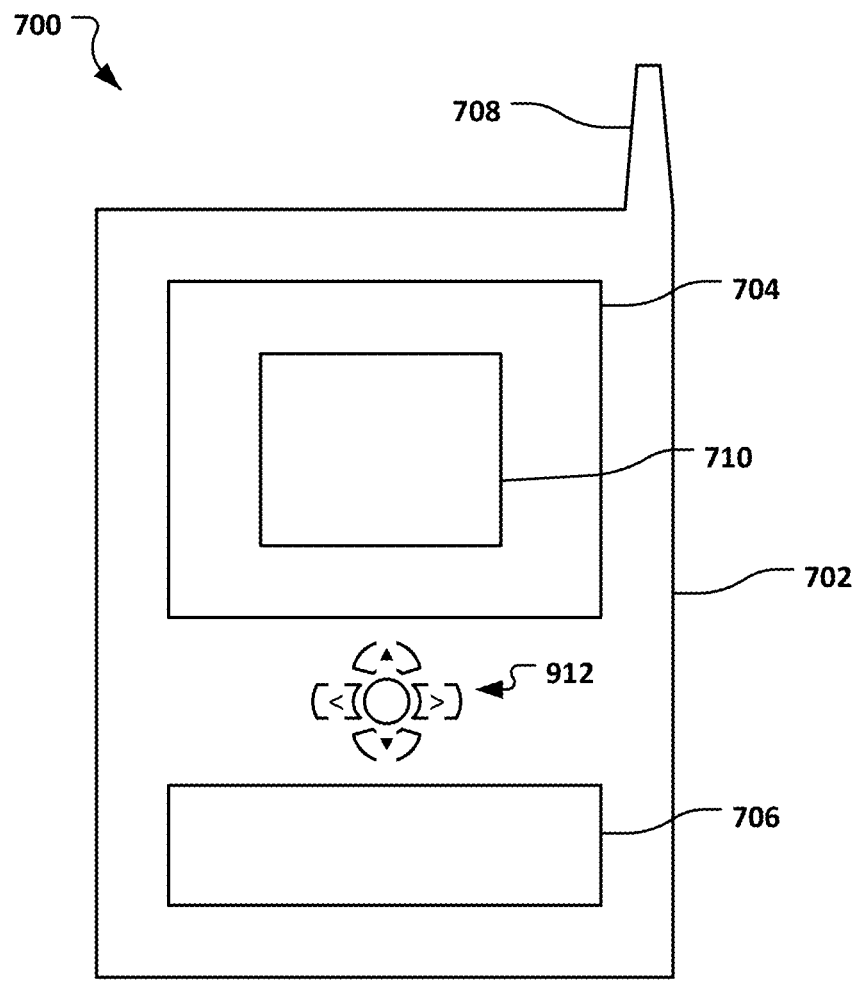
FIG. 7 shows a mobile computing system configured in accordance with an embodiment of the present disclosure.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, armband computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, mobile electronic device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device, which in one example embodiment is a touchscreen display. I/O device 706 may comprise any suitable I/O device for entering information into a mobile computing device. Examples for I/O device 706 may include an alphanumeric keyboard, a numeric keypad, a touch pad, input keys, buttons, a camera, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FURTHER EXAMPLE EMBODIMENTS

The following examples pertain to further embodiments, from which numerous permutations and configurations will be apparent.

Example 1 is a computer program product comprising one or more non-transient computer-readable mediums having encoded thereon executable instructions that, when executed by at least one processor, cause the at least one processor to carry out a process of producing a face image. The process comprises causing capture of an electronic image of the user with a camera; creating a three-dimensional mesh from at least a portion of the electronic image that includes an eye area of the user; identifying a viewing angle of the user by assessing surface features about the eye area; estimating an angle of rotation for gaze correction; rotating the three-dimensional mesh, based on the angle of rotation, to produce a rotated image of at least the eye area of the user; and updating the electronic image of the user with the rotated image.

Example 2 includes the subject matter of example 1, and further wherein causing capture of the electronic image of the user includes capturing the electronic image with two or more calibrated cameras.

Example 3 includes the subject matter of example 2, and further wherein creating the three-dimensional mesh includes creating the three-dimensional mesh from depth information obtained through rectifying the electronic image as captured by the two or more calibrated cameras and producing a disparity map.

Example 4 includes the subject matter of example 1, and further wherein causing capture of the electronic image includes capturing the electronic image and depth information with a camera and a depth sensor, respectively.

Example 5 includes the subject matter of example 4, and further wherein creating the three-dimensional mesh includes creating the three-dimensional mesh from depth information captured by the depth sensor.

Example 6 includes the subject matter of any of examples 3 and 5, and further wherein creating the three-dimensional mesh includes creating a point cloud of at least a portion of the eye area.

Example 7 includes the subject matter of any of examples 1-6, and further wherein identifying the viewing angle includes identifying a surface normal representative of a viewing direction of the user.

Example 8 includes the subject matter of example 7, and further wherein identifying the surface normal representative of the viewing direction of the user includes establishing a plurality of surface normals of the three-dimensional mesh and assessing the surface normals in the eye area are to identify a mean surface normal as the surface normal representative of the viewing direction of the user.

Example 9 includes the subject matter of any of examples 1-8, and further wherein rotating the three-dimensional mesh includes rotating the three-dimensional mesh to minimize the viewing angle with respect to a line of sight between the camera and an eye of the user.

Example 10 includes the subject matter of any of examples, 1-9 and further wherein creating the three-dimensional mesh from at least a portion of the electronic image that includes a face and torso area of the user.

Example 11 includes the subject matter of example 10, and further wherein rotating the three-dimensional mesh to produce the rotated image includes rotating the face and torso area of the user.

Example 12 includes the subject matter of any of examples 1-11, and further wherein the eye area is identified from a disparity map of the electronic image.

Example 13 includes the subject matter of any of examples 1-12, and further wherein rotating the three-dimensional mesh includes adjusting a tilt angle of the three-dimensional mesh to produce a rotated image of the user that provides apparent eye contact.

Example 14 includes the subject matter of example 13, and further wherein rotating the three-dimensional mesh further includes adjusting at least one of a pan angle and rotation angle of the three-dimensional mesh to produce a rotated image of the user.

Example 15 includes the subject matter of example 13, and further wherein rotating the three-dimensional mesh consists of adjusting a tilt angle of the three-dimensional.

Example 16 includes the subject matter of any of examples 1-15, and further wherein causing capture and updating the electronic image includes causing capture of and updating an electronic video image.

Example 17 includes the subject matter of any of examples 1-16, and further wherein causing capture and updating the electronic image includes capturing and updating a still image.

Example 18 includes the subject matter of any of examples 1-17, and further includes identifying whether the user is looking to a lateral side with respect to the camera and foregoing updates to the electronic image when the user is looking to the lateral side.

Example 19 includes the subject matter of any of examples 1-18, and further wherein causing capture of the electronic image includes capturing an electronic image of a plurality of users.

Example 20 includes the subject matter of example 19, and further includes creating a three-dimensional mesh from at least a portion of each of the plurality of users; identifying a viewing angle for each of the plurality of users' and updating the electronic image independently for each of the plurality of users.

Example 21 is a mobile computing device that includes the subject matter of any of examples 1-20 and an image capture device.

Example 22 is a system that comprises a camera; one or more processors; and a memory having encoded thereon executable instructions that, when executed by the one or more processors, cause the one or more processors to carry out a process of enabling eye contact in imaging systems. The process includes capturing an electronic image of the user with the camera; creating a three-dimensional mesh from at least a portion of the electronic image that includes an eye area of the user; identifying a viewing angle of the user by assessing surface features about the eye area; estimating an angle of rotation for gaze correction; rotating the three-dimensional mesh, based on the angle of rotation, to produce a rotated image of at least the eye area of the user; and updating the electronic image of the user with the rotated image.

Example 23 includes the subject matter of example 22, and further wherein capturing the electronic image of the user includes capturing the electronic image with two or more calibrated cameras Example 24 includes the subject matter of example 23, and further wherein creating the three-dimensional mesh includes creating the three-dimensional mesh from depth information obtained through rectifying the electronic image as captured by the two or more calibrated cameras and producing a disparity map.

Example 25 includes the subject matter of example 22, and further wherein capturing the electronic image includes capturing the electronic image and depth information with a camera and a depth sensor, respectively.

Example 26 includes the subject matter of example 25, and further wherein creating the three-dimensional mesh includes creating the three-dimensional mesh from depth information captured by the depth sensor.

Example 27 includes the subject matter of any of examples 24 and 26, and further wherein creating the three-dimensional mesh includes creating a point cloud of at least a portion of the eye area.

Example 28 includes the subject matter of any claims 22-27, and further wherein identifying the viewing angle includes identifying a surface normal representative of a viewing direction of the user.

Example 29 includes the subject matter of example 28, and further wherein identifying the surface normal representative of the viewing direction of the user includes establishing a plurality of surface normals of the three-dimensional mesh and assessing the surface normals in the eye area are to identify a mean surface normal as the surface normal representative of the viewing direction of the user.

Example 30 includes the subject matter of any of examples 22-29, and further wherein rotating the three-dimensional mesh includes rotating the three-dimensional mesh to minimize the viewing angle with respect to a line of sight between the camera and an eye of the user.

Example 31 includes the subject matter of any of examples 22-30, and further wherein creating the three-dimensional mesh from at least a portion of the electronic image that includes a face and torso area of the user.

Example 32 includes the subject matter of example 31, and further wherein rotating the three-dimensional mesh to produce the rotated image includes rotating the face and torso area of the user.

Example 33 includes the subject matter of any of examples 22-32, and further wherein the eye area is identified from a disparity map of the electronic image.

Example 34 includes the subject matter of any of examples 22-33, and further wherein rotating the three-dimensional mesh includes adjusting a tilt angle of the three-dimensional mesh to produce a rotated image of the user that provides apparent eye contact.

Example 35 includes the subject matter of example 34, and further wherein rotating the three-dimensional mesh further includes adjusting at least one of a pan angle and rotation angle of the three-dimensional mesh to produce a rotated image of the user.

Example 36 includes the subject matter of example 34, and further wherein rotating the three-dimensional mesh consists of adjusting a tilt angle of the three-dimensional mesh.

Example 37 includes the subject matter of any of examples 22-36, and further wherein capturing and updating the electronic image includes capturing and updating an electronic video image.

Example 38 includes the subject matter of any of examples 22-37, and further wherein capturing and updating the electronic image includes capturing and updating a still image.

Example 39 includes the subject matter of any of examples 22-38, and further includes identifying whether the user is looking to a lateral side with respect to the camera and foregoing updates to the electronic image when the user is looking to the lateral side.

Example 40 includes the subject matter of any of examples 22-39, and further wherein capturing the electronic image includes capturing an electronic image of a plurality of users.

Example 41 includes the subject matter of example 40, and further includes creating a three-dimensional mesh from at least a portion of each of the plurality of users; identifying a viewing angle for each of the plurality of users; and updating the electronic image independently for each of the plurality of users.

Example 42 includes the subject matter of any of examples 22-41, and further wherein the system is a mobile computing device Example 43 includes the subject matter of example 42, and further wherein the mobile computing device is a smartphone, a tablet computer, or a laptop computer.

Example 44 is a method of enabling eye contact in imaging systems. The method comprises capturing an electronic image of the user with a camera; creating a three-dimensional mesh from at least a portion of the electronic image that includes an eye area of the user; identifying a viewing angle of the user by assessing surface features about the eye area; estimating an angle of rotation for gaze correction; rotating the three-dimensional mesh, based on the angle of rotation, to produce a rotated image of at least the eye area of the user; and updating the electronic image of the user with the rotated image.

Example 45 includes the subject matter of example 44, and further wherein capturing the electronic image of the user includes capturing the electronic image with two or more calibrated cameras Example 46 includes the subject matter of example 45, and further wherein creating the three-dimensional mesh includes creating the three-dimensional mesh from depth information obtained through rectifying the electronic image as captured by the two or more calibrated cameras and producing a disparity map.

Example 47 includes the subject matter of example 44, and further wherein capturing the electronic image includes capturing the electronic image and depth information with a camera and a depth sensor, respectively.

Example 48 includes the subject matter of example 47, and further wherein creating the three-dimensional mesh includes creating the three-dimensional mesh from depth information captured by the depth sensor.

Example 49 includes the subject matter of any of examples 46 and 48, and further wherein creating the three-dimensional mesh includes creating a point cloud of at least a portion of the eye area.

Example 50 includes the subject matter of any of examples 44-49, and further wherein identifying the viewing angle includes identifying a surface normal representative of a viewing direction of the user.

Example 51 includes the subject matter of example 50, and further wherein identifying the surface normal representative of the viewing direction of the user includes establishing a plurality of surface normals of the three-dimensional mesh and assessing the surface normals in the eye area are to identify a mean surface normal as the surface normal representative of the viewing direction of the user.

Example 52 includes the subject matter of any of examples 44-51, and further wherein rotating the three-dimensional mesh includes rotating the three-dimensional mesh to minimize the viewing angle with respect to a line of sight between the camera and an eye of the user.

Example 53 includes the subject matter of any of examples 44-52, and further wherein creating the three-dimensional mesh from at least a portion of the electronic image that includes a face and torso area of the user.

Example 54 includes the subject matter of example 53, and further wherein rotating the three-dimensional mesh to produce the rotated image includes rotating the face and torso area of the user.

Example 55 includes the subject matter of any of examples 44-54, and further wherein the eye area is identified from a disparity map of the electronic image.

Example 56 includes the subject matter of any of examples 44-55, and further wherein rotating the three-dimensional mesh includes adjusting a tilt angle of the three-dimensional mesh to produce a rotated image of the user that provides apparent eye contact.

Example 57 includes the subject matter of example 56, and further wherein rotating the three-dimensional mesh further includes adjusting at least one of a pan angle and rotation angle of the three-dimensional mesh to produce a rotated image of the user.

Example 58 includes the subject matter of example 56, and further wherein rotating the three-dimensional mesh consists of adjusting a tilt angle of the three-dimensional mesh.

Example 59 includes the subject matter of any of examples 44-58, and further wherein capturing and updating the electronic image includes capturing and updating an electronic video image.

Example 60 includes the subject matter of any of examples 44-59, and further wherein capturing and updating the electronic image includes capturing and updating a still image.

Example 61 includes the subject matter of any of examples 44-60, and further includes identifying whether the user is looking to a lateral side with respect to the camera and foregoing updates to the electronic image when the user is looking to the lateral side.

Example 62 includes the subject matter of any of examples 44-61, and further wherein capturing the electronic image includes capturing an electronic image of a plurality of users.

Example 63 includes the subject matter of example 62, and further includes: creating a three-dimensional mesh from at least a portion of each of the plurality of users; identifying a viewing angle for each of the plurality of users; and updating the electronic image independently for each of the plurality of users.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer program product comprising one or more non-transient computer-readable mediums having encoded thereon executable instructions that, when executed by at least one processor, cause the at least one processor to carry out a process of producing a face image, the process comprising:
    causing capture of an electronic image of the user with a camera;
    creating a three-dimensional mesh having a plurality of points from at least a portion of the electronic image that includes an eye area of the user, each point in the three-dimensional mesh being associated with color or grayscale information in the electronic image;
    identifying a viewing angle of the user by calculating, at each point in the three dimensional mesh, a plurality of surface normals orthogonal to a plane that is tangent to a surface of the eye area of the user, and calculating a mean surface normal from the plurality of surface normals, wherein the viewing angle of the user is the mean surface normal;
    estimating an angle of rotation for gaze correction;
    rotating the three-dimensional mesh, based on the angle of rotation, to produce a rotated image of at least the eye area of the user, the rotated image including color or grayscale information associated with each point of the rotated three-dimensional mesh; and
    updating the electronic image of the user with the color or grayscale information in the rotated image.

2. The computer program product of claim 1, wherein causing capture of the electronic image of the user includes capturing the electronic image with two or more calibrated cameras.

3. The computer program product of claim 2, wherein creating the three-dimensional mesh includes creating the three-dimensional mesh from depth information obtained through rectifying the electronic image as captured by the two or more calibrated cameras and producing a disparity map.

4. The computer program product of claim 1, wherein rotating the three-dimensional mesh includes rotating the three-dimensional mesh to minimize the viewing angle with respect to a line of sight between the camera and an eye of the user.

5. The computer program product of claim 1, wherein the eye area is identified from a disparity map of the electronic image.

6. The computer program product of claim 1, wherein rotating the three-dimensional mesh includes adjusting a tilt angle of the three-dimensional mesh to produce a rotated image of the user that provides apparent eye contact.

7. The computer program product of claim 6, wherein rotating the three-dimensional mesh further includes adjusting at least one of a pan angle and rotation angle of the three-dimensional mesh to produce a rotated image of the user.

8. The computer program product of claim 1, further comprising:
    identifying whether the user is looking to a lateral side with respect to the camera and foregoing updates to the electronic image when the user is looking to the lateral side.

9. A mobile computing device comprising the computer program product of claim 1 and the camera of claim 1.

10. A system, comprising:
    a camera;
    one or more processors; and
    a memory having encoded thereon executable instructions that, when executed by the one or more processors, cause the one or more processors to carry out a process of enabling eye contact in imaging systems, the process including:
        capturing an electronic image of the user with the camera;
        creating a three-dimensional mesh having a plurality of points from at least a portion of the electronic image that includes an eye area of the user, each point in the three-dimensional mesh being associated with color or grayscale information in the electronic image;
        identifying a viewing angle of the user by calculating, at each point in the three dimensional mesh, a plurality of surface normals orthogonal to a plane that is tangent to a surface of the eye area of the user, and calculating a mean surface normal from the plurality of surface normals, wherein the viewing angle of the user is the mean surface normal;
        estimating an angle of rotation for gaze correction;

rotating the three-dimensional mesh, based on the angle of rotation, to produce a rotated image of at least the eye area of the user, the rotated image including color or grayscale information associated with each point of the rotated three-dimensional mesh; and updating the electronic image of the user with the color or grayscale information in the rotated image.

11. The system of claim 10, wherein capturing the electronic image includes capturing the electronic image and depth information with a camera and a depth sensor, respectively.

12. The system of claim 11, wherein creating the three-dimensional mesh includes creating the three-dimensional mesh from depth information captured by the depth sensor.

13. The system of claim 12, wherein creating the three-dimensional mesh includes creating a point cloud of at least a portion of the eye area.

14. The system of claim 10, wherein creating the three-dimensional mesh from at least a portion of the electronic image that includes a face and torso area of the user.

15. The system of claim 14, wherein rotating the three-dimensional mesh to produce the rotated image includes rotating the face and torso area of the user.

16. The system of claim 10, wherein capturing the electronic image includes capturing an electronic image of a plurality of users.

17. The system of claim 16, further comprising:
creating a three-dimensional mesh from at least a portion of each of the plurality of users;
identifying a viewing angle for each of the plurality of users; and
updating the electronic image independently for each of the plurality of users.

18. The system of claim 10, wherein the system is a mobile computing device.

19. The system of claim 18, wherein the mobile computing device is a smartphone, a tablet computer, or a laptop computer.

20. A method of enabling eye contact in imaging systems, the method comprising:
capturing an electronic image of the user with a camera;
creating a three-dimensional mesh having a plurality of points from at least a portion of the electronic image that includes an eye area of the user, each point in the three-dimensional mesh being associated with color or grayscale information in the electronic image;
identifying a viewing angle of the user by calculating, at each point in the three dimensional mesh, a plurality of surface normals orthogonal to a plane that is tangent to a surface of the eye area of the user, and calculating a mean surface normal from the plurality of surface normals, wherein the viewing angle of the user is the mean surface normal;
estimating an angle of rotation for gaze correction;
rotating the three-dimensional mesh, based on the angle of rotation, to produce a rotated image of at least the eye area of the user, the rotated image including color or grayscale information associated with each point of the rotated three-dimensional mesh; and
updating the electronic image of the user with the color or grayscale information in the rotated image.

21. The method of claim 20, wherein rotating the three-dimensional mesh includes rotating the three-dimensional mesh to minimize the viewing angle with respect to a line of sight between the camera and an eye of the user.

22. The method of claim 20, wherein capturing and updating the electronic image includes capturing and updating an electronic video image.

23. The method of claim 20, wherein capturing and updating the electronic image includes capturing and updating a still image.

* * * * *